US009520798B2

(12) United States Patent
Raju et al.

(10) Patent No.: US 9,520,798 B2
(45) Date of Patent: Dec. 13, 2016

(54) MULTI-LEVEL DC-DC CONVERTER WITH GALVANIC ISOLATION AND ADAPTIVE CONVERSION RATIO

(71) Applicant: General Electric Company, Schenectady, NY (US)

(72) Inventors: Ravisekhar Nadimpalli Raju, Clifton Park, NY (US); Rajib Datta, Niskayuna, NY (US); Xu She, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 291 days.

(21) Appl. No.: 14/469,002

(22) Filed: Aug. 26, 2014

(65) Prior Publication Data

US 2016/0065081 A1    Mar. 3, 2016

(51) Int. Cl.
*H02M 3/335* (2006.01)
*H02M 3/28* (2006.01)
*H02M 1/00* (2006.01)

(52) U.S. Cl.
CPC ......... *H02M 3/33569* (2013.01); *H02M 3/285* (2013.01); *H02M 2001/0074* (2013.01)

(58) Field of Classification Search
CPC .............. H02M 3/285; H02M 3/33569; H02M 2001/0074; H02M 3/335
USPC ........................................................ 363/21.1
See application file for complete search history.

(56) References Cited

U.S. PATENT DOCUMENTS

| | | | |
|---|---|---|---|
| 6,151,222 A | 11/2000 | Barrett | |
| 6,297,616 B1 * | 10/2001 | Kubo | H02J 7/0027 320/116 |
| 6,483,282 B1 | 11/2002 | Bayer | |
| 7,557,552 B2 | 7/2009 | Vo | |
| 8,208,274 B2 | 6/2012 | Raju et al. | |

(Continued)

FOREIGN PATENT DOCUMENTS

| | | |
|---|---|---|
| EP | 2290799 A1 | 3/2011 |
| EP | 2621076 A1 | 7/2013 |

OTHER PUBLICATIONS

Datta et al., "Multipulse Converter—Topology and Control for Utility Power Conversion," IEEE Industrial Electronics, IECON 2006—32nd Annual Conference, Nov. 6-10, 2006, pp. 1950-1955.

*Primary Examiner* — Jessica Han
*Assistant Examiner* — Lorena Bruner
(74) *Attorney, Agent, or Firm* — Ziolkowski Patent Solutions Group, SC; Jean K. Testa

(57) ABSTRACT

A multi-level DC-DC converter includes an input side to receive a DC power having an input voltage and current, an output side to provide power to a load at a desired output voltage and current, and a plurality of tranformer-isolated DC-DC converters connected between the input and output sides, with the tranformer-isolated DC-DC converters being connected in series on one side and connected in parallel on another side. Each of the tranformer isolated DC-DC converters further includes a power transformer having a primary winding and a secondary winding, and a plurality of switching devices each selectively operable in one of an On state and an Off state. Operating the switching devices in a complementary On state and Off state alternately at a controlled switching frequency provides for engaging the tranformer isolated DC-DC converter and operating the switching devices in a simultaneously On state bypasses the transformer isolated DC-DC converter.

20 Claims, 2 Drawing Sheets

(56) References Cited

U.S. PATENT DOCUMENTS

| | | |
|---|---|---|
| 8,310,102 B2 | 11/2012 | Raju |
| 2005/0270812 A1* | 12/2005 | Vinciarelli ............ H02M 3/157 363/65 |
| 2006/0131960 A1* | 6/2006 | Aritsuka ............... H02J 3/1814 307/17 |
| 2013/0343089 A1 | 12/2013 | Gupta et al. |

* cited by examiner

MULTI-LEVEL DC-DC CONVERTER WITH GALVANIC ISOLATION AND ADAPTIVE CONVERSION RATIO

BACKGROUND OF THE INVENTION

Embodiments of the invention relate generally to power converters and, more particularly, to a DC-DC power converter that provides galvanic isolation and an adaptive conversion ratio.

Switch mode DC-DC converters are widely used for converting a given input electrical power to a desired output electrical power, with such DC-DC converters being able to function as boost-type converters (converting an input voltage to a higher output voltage), buck-type converters (converting an input voltage to a lower output voltage), or converters capable of both boosting or bucking the voltage. In addition, they can be classified as unidirectional or bi-directional converters based on their ability to flow power. In switch mode DC-DC converters, the input power is provided from a source to the converter through input terminals on an input side, converted by the converter into the desired output power and then output through output terminals on an output side provided to a load. The converter comprises a switching arrangement and power transformer for transferring the electrical power from the input side to the output side and for modulating the input electrical power before it is provided to the output terminals. The switches employed in such switching arrangements are typically comprised of solid state switches, such as MOSFET transistors for example. The transformer provides for galvanic isolation between the input and output and voltage step-up or step-down.

Often in switch mode DC-DC converters, the switches are activated by means of a control circuit controlling the phase angle, frequency (i.e., frequency modulation) and/or duty cycle of the switches in the switching arrangements to assume an ON-state (switch closed) or an OFF-state (switch open) in order to regulate voltage and current. For example, in the case of MOSFET switches, the control circuit is adapted to provide a gate voltage to switch the source-drain conduction channel ON (conducting) or OFF (non-conducting) in a timed manner. A rectifying diode may also be implemented by a three-terminal device, such as a MOSFET, by operating the control circuit driving the three-terminal device in a synchronous rectification mode.

In order to implement DC-DC converters used in high power applications, cascaded DC-DC converters with multi-level scheme may be used.

While existing pulse width modulation, phase shift control or frequency modulation control techniques that are employed for controlling switching in a DC-DC converter are effective for purposes of regulating voltage and current to a desired level, such control techniques can suffer from efficiency issues when they are used over a wide regulation range. To alleviate this, cascaded DC-DC converters have been used in prior art with coarse regulation performed by bypassing or engaging selected number of converters with external switches, and fine regulation done through modulation changes in a narrow range. The external switches result in increased size and cost, and also lead to additional power losses due to conduction drops.

Therefore, it is desirable to provide DC-DC converters and associated control scheme for operating the converters that increases the efficiency of the converters. It is also desirable that the DC-DC converters include a minimal number of switches therein necessary to regulate voltage and current, such that the number of switches is reduced and a compact DC-DC conversion system is provided.

BRIEF DESCRIPTION OF THE INVENTION

Embodiments of the invention provide a multi-level DC-DC converter (and method of manufacture thereof) that provides galvanic isolation and an adaptive conversion ratio.

In accordance with one aspect of the invention, a multi-level DC-DC converter includes an input side to receive a DC power having an input voltage and current, an output side to provide power to a load at a desired output voltage and current, and a plurality of tranformer-isolated DC-DC converters connected between the input side and the output side, with the plurality of tranformer-isolated DC-DC converters being connected in series on one side and connected in parallel on another side. Each of the plurality of tranformer isolated DC-DC converters further includes a power transformer having a primary winding arranged in an input side converter stage on the input side and a secondary winding arranged in an output side converter stage on the output side, and a plurality of switching devices each selectively operable in one of an On state and an Off state, wherein operating the plurality of switching devices in a complementary On state and Off state alternately at a controlled switching frequency provides for engaging the tranformer isolated DC-DC converter and operating the plurality of switching devices in a simultaneously On state bypasses the transformer isolated DC-DC converter.

In accordance with another aspect of the invention, a multi-level DC-DC converter includes an input side to receive a DC power having an input voltage and current, an output side to provide power to a load at a desired output voltage and current, and a plurality of tranformer isolated DC-DC converters connected between the input side and the output side such that the plurality of tranformer isolated DC-DC converters are connected in series on one side and connected in parallel on the other side, each of the plurality of tranformer isolated DC-DC converters including a bridge circuit therein. The multi-level DC-DC converter also includes a controller in operable communication with each of the plurality of tranformer isolated DC-DC converters to selectively operate each respective bridge circuit, the controller being programmed to determine a desired value of a voltage conversion ratio between the input voltage and the output voltage and control operation of the bridge circuit in each respective tranformer isolated DC-DC converter based on the desired value of the voltage conversion ratio, wherein one or more of the tranformer isolated DC-DC converters may be shorted based on the controlled operation of the respective bridge circuits, so as to bypass one or more of the tranformer isolated DC-DC converters and set the voltage conversion ratio to the desired value.

In accordance with yet another aspect of the invention, a method of manufacturing a multi-level DC-DC converter includes providing a plurality of tranformer isolated DC-DC converters, with each of the plurality of tranformer isolated DC-DC converters comprising a power transformer comprising a primary winding arranged in an input side converter stage and a secondary winding arranged in an output side converter stage and a plurality of switching devices arranged in the input side converter stage, with each of the plurality of switching devices being selectively operable in one of an On state and an Off state to control voltage and current flow to the primary winding. The method also includes connecting the plurality of tranformer isolated DC-DC converters in series on one side of the multi-level DC-DC converter and in parallel on another side of the multi-level DC-DC converter and providing a controller that is in operable communication with each of the plurality of tranformer isolated DC-DC converters and the plurality of switching devices therein, with the controller being programmed to operate the plurality of switching devices in each respective tranformer isolated DC-DC converter in one of the On state and the Off state so as to selectively engage and disengage the respective tranformer isolated DC-DC converter.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Embodiments of the invention provide a multi-level DC-DC power converter that provides galvanic isolation and an adaptive conversion ratio. A number of transformer isolated DC-DC converters are connected in series on one side of the power converter and connected in parallel on another side of the converter. Existing switches in each of the transformer isolated DC-DC converters are used to selectively engage and disengage the respective converter, so as to provide for a multi-level DC-DC power converter having a variable conversion ratio.

Figure 1:
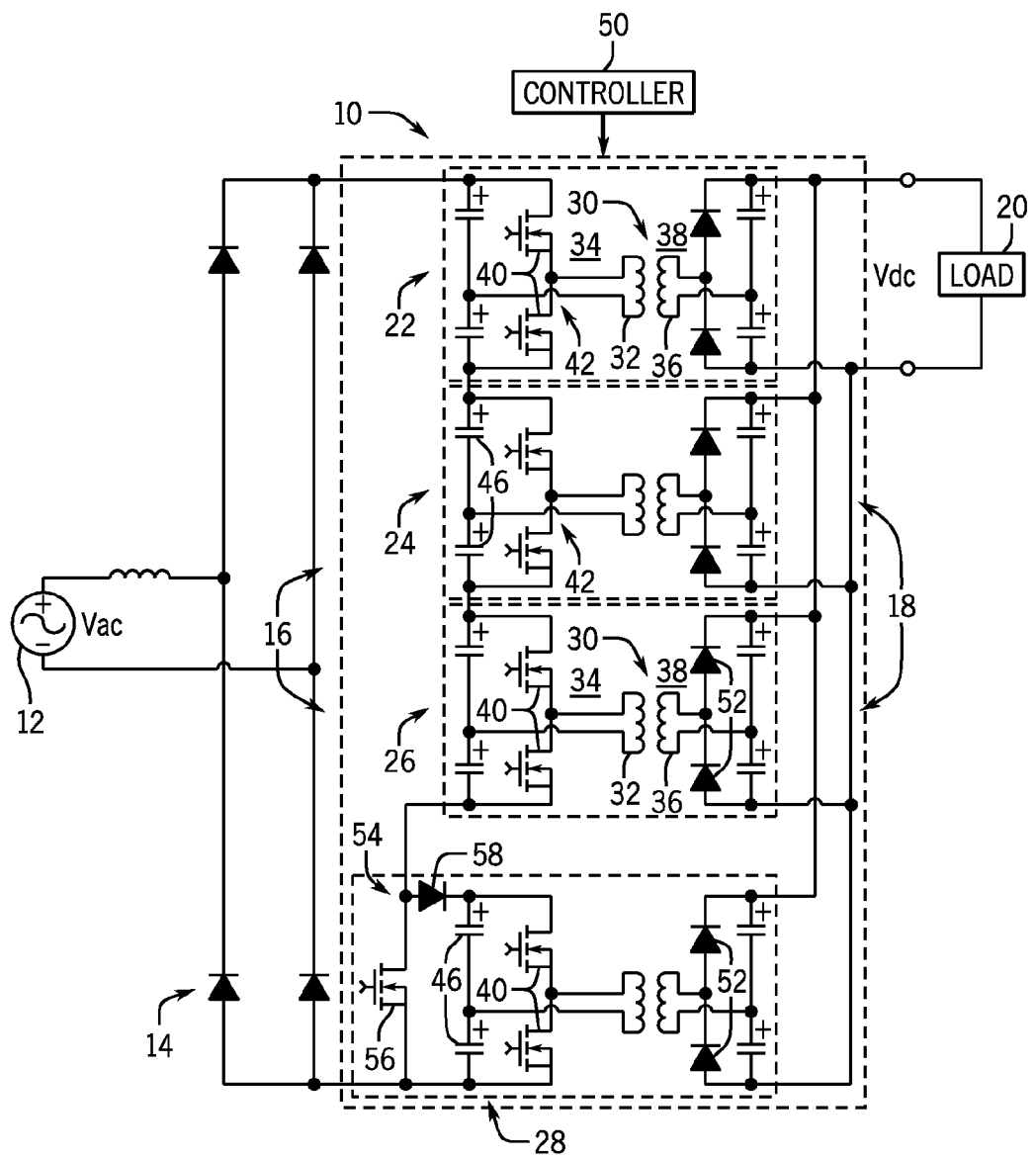
FIG. 1 is a schematic block diagram of a multi-level DC-DC power converter, according to an embodiment of the invention.

Referring to FIG. 1, a multi-level DC-DC power converter 10 is shown according to one embodiment of the invention. The multi-level DC-DC power converter 10 receives power from a power source 12, such as an AC input power source, with the power from the AC power source 12 being fed to a rectifier bridge 14 such as the four diode rectifier shown in FIG. 1. The rectifier bridge 14 converts the AC power input to a DC power such that a DC bus voltage and current is provided to an input side 16 of the multi-level DC-DC power converter 10. Alternately, the DC power to input side 16 can be supplied by a DC source or DC transmission system.

Connected to an output side 18 of the multi-level DC-DC power converter 10 is a load 20, with the load 20 receiving a power output from the multi-level DC-DC power converter 10 at a desired output voltage or current. The load 20 may be in the form of a DC load that receives the output voltage and current directly from the multi-level DC-DC power converter 10, or the load 20 may be an AC load—such that an inverter (not shown) would receive the output voltage and current from the multi-level DC-DC power converter 10 and invert the DC power to an AC power for use by the load 20.

As shown in FIG. 1, the multi-level DC-DC power converter 10 is composed of a plurality of transformer isolated DC-DC converters 22, 24, 26, 28 (or "converter blocks"). While the multi-level DC-DC power converter 10 is shown as having an arrangement of four transformer isolated DC-DC converters 22, 24, 26, 28, it is recognized that a greater or lesser number of DC-DC converters could be included. The tranformer isolated DC-DC converters 22, 24, 26, 28 are connected between the input side 16 and the output side of the multi-level DC-DC power converter 10, with the tranformer isolated DC-DC converters 22, 24, 26, 28 being connected in series on the input side 16 and connected in parallel on the output side 18. The connection of the transformer isolated DC-DC converters 22, 24, 26, 28 in series on the input side 16 and in parallel on the output side 18 allows for the multi-level DC-DC power converter 10 to provide a desired conversion ratio between the input voltage and the output voltage via selective control of the individual DC-DC converters 22, 24, 26, 28, as will be explained in greater detail below.

As shown in FIG. 1, each of the tranformer isolated DC-DC converters 22, 24, 26, 28 includes a power transformer 30 having a primary winding 32 arranged in an input side converter stage 34 on the input side 16 and a secondary winding 36 arranged in an output side converter stage 38 on the output side 18. A plurality of switching devices 40 that collectively control current through the primary winding 32 of the power transformer 30 are also provided on the input side converter stage 34. According to an exemplary embodiment, the switching devices 40 are provided as metal oxide semiconductor field effect transistors (MOSFETs) operable in an On state and an Off state to control current flow therethrough. However, embodiments of the invention are not limited to MOSFETs. Any appropriate electronic switch can be used, such as, for example, insulated gate bipolar transistors (IGBTs) in anti-parallel with a diode, bipolar junction transistors (BJTs), and metal oxide semiconductor controlled thyristors (MCTs). The switching devices (and diodes) can be made with Silicon (Si), Silicon Carbide (SiC), Gallium Nitride (GaN), or any suitable Wide Bandgap (WBG) material.

Figure 2:
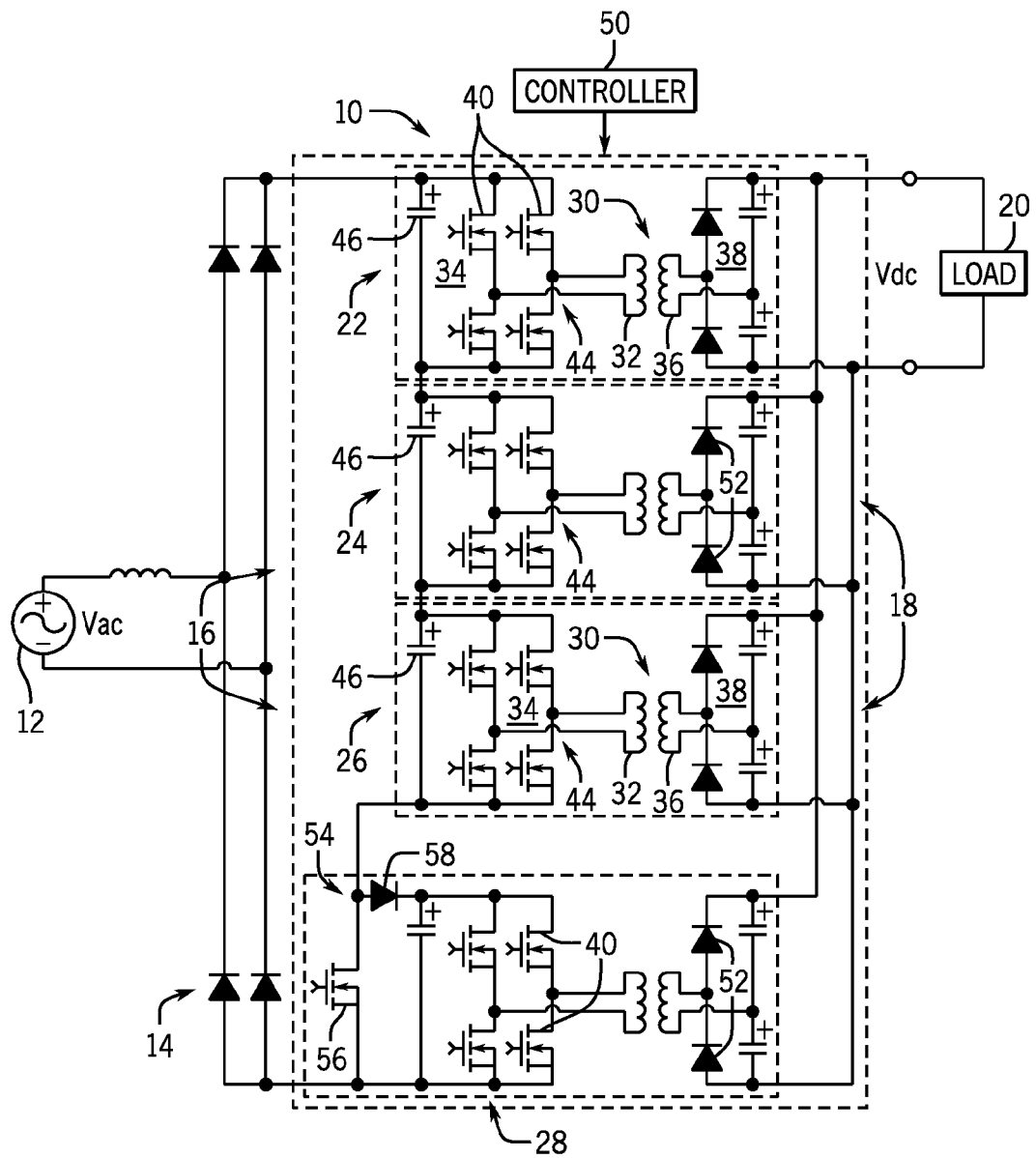
FIG. 2 is a schematic block diagram of a multi-level DC-DC power converter, according to another embodiment of the invention.

According to an exemplary embodiment, two switching devices 40 (e.g., MOSFETs) are included in each tranformer isolated DC-DC converter 22, 24, 26, 28 and are arranged so as to provide a half-bridge circuit topology—indicated at 42. The half-bridge circuit topology 42 serves as a fundamental building block for each DC-DC power converter 22, 24, 26, 28, with the switching devices 40 being controlled to provide a desired power conversion. It is recognized, however, that rather than two switching devices 40 being provided as a half-bridge circuit 42, the tranformer isolated DC-DC converters 22, 24, 26, 28 could instead each include four switching devices 40 that are arranged so as to provide a full-bridge circuit topology 44, as is shown in FIG. 2.

As shown in FIG. 1, each of the tranformer isolated DC-DC converters 22, 24, 26, 28 also includes a pair of input capacitors 46 arranged in parallel with the switching devices 40 (i.e., with the half-bridge circuit 42) that store and release DC power received on the input side converter stage 34 of the DC-DC converter. The controlling of the switching devices 40 provides for the storing and releasing of DC power by the input capacitors 46, with the DC power being selectively provided to the primary winding 32 of the power transformer 30.

Also included in the multi-level DC-DC power converter 10 is a controller 50 that is in operable communication with the switching devices 40 in each tranformer isolated DC-DC converter 22, 24, 26, 28. The controller 50 is programmed to selectively operate each of the plurality of switching devices 40 in an On state and Off state to control current flow therethrough. In one embodiment, where the switching devices 40 are MOSFETs, the controller 50 sends gating signals to the MOSFETs to control the operation thereof in an On or Off state. In one embodiment, the controller 50 operates the switching devices 40 in a complementary fashion at substantially square wave duty cycle to feed the associated primary winding 32 with a substantially square wave voltage from the associated DC input capacitors 46 when the respective DC-DC converter is engaged to flow power.

The controller 50 is programmed to implement a control scheme by which both the switching devices 40 are simultaneously kept ON to selectively disengage power flow through the associated DC-DC converter to the output 18. That is, the controller 50 is programmed to operate one or more switching devices 40 in a transformer isolated DC-DC converter 22, 24, 26, 28 in the On state so as to bypass the input capacitors 46, such that a respective transformer isolated DC-DC converter 22, 24, 26, 28 can be disengaged. A respective transformer isolated DC-DC converter 22, 24, 26, 28 can therefore be shorted on the input side 16 through the switching devices 40 feeding the power transformer primary winding 32, thus causing the particular DC-DC converter 22, 24, 26, 28 to be bypassed. That is, the input capacitors 46 can be shorted by controlling the switching devices 40—and with high frequency conversion, the input capacitors 46 can be small such that shorting them does not lead to excessive losses. By selectively engaging and disengaging respective transformer isolated DC-DC converters 22, 24, 26, 28 in the multi-level DC-DC power converter 10, an adapative conversion ratio is achievable for the multi-level DC-DC power converter, with a suitable conversion ratio between input and output voltage being selectable via the controlled operation of each transformer isolated DC-DC converter 22, 24, 26, 28.

As a further means for disengaging a transformer isolated DC-DC converter 22, 24, 26, 28, it is recognized that the output of a particular DC-DC converter will be disengaged naturally if a diode rectifier 52 is used at the secondary winding 36 (as shown in FIG. 1) or if the gates of active switches (e.g., MOSFETS) (not shown) are turned OFF at the secondary winding 36.

According to one embodiment, the controller 50—in being programmed to selectively cause one or more of the transformer isolated DC-DC converters 22, 24, 26, 28 to be bypassed—first functions to determine a desired value of a voltage conversion ratio between the input voltage and the output voltage for the multi-level DC-DC power converter 10. This determination of the desired voltage conversion ratio may, according to one embodiment, be performed via an input to the controller 50 from an operator and may be based on the ratings/requirements of the power source 12 and the load 20 with which the multi-level DC-DC power converter 10 is connected. Based on the desired value of the voltage conversion ratio determined by the controller 50, the controller 50 then functions to control operation of the switching devices 40 in each respective tranformer isolated DC-DC converter 22, 24, 26, 28 to selectively engage/disengage each DC-DC converter and thereby control the conversion ratio of the multi-level DC-DC power converter 10.

According to an exemplary embodiment, the controller 50 may function to control the switching devices 40 in each transformer isolated DC-DC converter 22, 24, 26, 28 in a manner that causes the converters to be engaged at a peak of an AC cycle (as provided by power source 12). Beneficially, higher efficiency may be achieved by engaging the transformer isolated DC-DC converters 22, 24, 26, 28 at the peak of an AC cycle.

Referring still to FIG. 1, it is shown therein that transformer isolated DC-DC converter 28 further includes therein a chopper stage 54, according to an exemplary embodiment. The chopper stage 54 includes a switching device 56 (e.g., MOSFET) and diode 58 positioned to receive a DC power from the rectifier circuit 14 and perform an initial conversion thereon, with the chopper stage 54 performing modulation to provide for this conversion. The chopper stage 54 performs the initial conversion with high efficiency, fast response and a smooth control, and thus allows for a "fine tuning" of the output voltage and/or current provided by the DC-DC converter 28. While only DC-DC converter 28 is shown in FIG. 1 as including a chopper stage 54 therein that provides for such voltage tuning, it is recognized that additional ones of the transformer isolated DC-DC converters 22, 24, 26 in multi-level DC-DC power converter 10 could also include such a chopper stage 54. In another embodiment, the voltage ratio "fine tuning" could be done through modulation of one or more of the DC-DC converters which are kept engaged, with "coarse tuning" done through selection of the number of DC-DC converters which are engaged or disengaged.

Beneficially, embodiments of the invention thus provide a multi-level DC-DC power converter that provides galvanic isolation and an adaptive conversion ratio. Each of the tranformer isolated DC-DC converters in the multi-level DC-DC converter can be operated at a fixed frequency and duty ratio, therefore allowing high efficiency and optimized design and performance in the multi-level DC-DC power converter. The efficiency can be improved further by using resonant elements in the primary or secondary side of the transformers 30 to reduce switching losses. A particular number of the DC-DC converters can be selectively engaged and disengaged to select/provide a suitable conversion ratio between input and output voltage.

Of further benefit, as the switching devices used within each of the DC-DC converters are used to provide for the engaging/disengaging of the respective converters, no additional switches are required, thereby providing a high efficiency in the converter and providing a compact converter at lower cost. Due to its reduced size, the compact DC-DC converters are thus useable in applications such as laptop chargers or other portable equipment.

According to one embodiment of the invention, a multi-level DC-DC converter includes an input side to receive a DC power having an input voltage and current, an output side to provide power to a load at a desired output voltage and current, and a plurality of tranformer-isolated DC-DC converters connected between the input side and the output side, with the plurality of tranformer-isolated DC-DC converters being connected in series on one side and connected in parallel on another side. Each of the plurality of tranformer isolated DC-DC converters further includes a power transformer having a primary winding arranged in an input side converter stage on the input side and a secondary winding arranged in an output side converter stage on the output side, and a plurality of switching devices each selectively operable in one of an On state and an Off state, wherein operating the plurality of switching devices in a complementary On state and Off state alternately at a controlled switching frequency provides for engaging the tranformer isolated DC-DC converter and operating the plurality of switching devices in a simultaneously On state bypasses the transformer isolated DC-DC converter.

According to another embodiment of the invention, a multi-level DC-DC converter includes an input side to receive a DC power having an input voltage and current, an output side to provide power to a load at a desired output voltage and current, and a plurality of tranformer isolated DC-DC converters connected between the input side and the output side such that the plurality of tranformer isolated DC-DC converters are connected in series on one side and connected in parallel on the other side, each of the plurality of tranformer isolated DC-DC converters including a bridge circuit therein.

The multi-level DC-DC converter also includes a controller in operable communication with each of the plurality of tranformer isolated DC-DC converters to selectively operate each respective bridge circuit, the controller being programmed to determine a desired value of a voltage conversion ratio between the input voltage and the output voltage and control operation of the bridge circuit in each respective tranformer isolated DC-DC converter based on the desired value of the voltage conversion ratio, wherein one or more of the tranformer isolated DC-DC converters may be shorted based on the controlled operation of the respective bridge circuits, so as to bypass one or more of the tranformer isolated DC-DC converters and set the voltage conversion ratio to the desired value.

According to yet another embodiment of the invention, a method of manufacturing a multi-level DC-DC converter includes providing a plurality of tranformer isolated DC-DC converters, with each of the plurality of tranformer isolated DC-DC converters comprising a power transformer comprising a primary winding arranged in an input side converter stage and a secondary winding arranged in an output side converter stage and a plurality of switching devices arranged in the input side converter stage, with each of the plurality of switching devices being selectively operable in one of an On state and an Off state to control voltage and current flow to the primary winding. The method also includes connecting the plurality of tranformer isolated DC-DC converters in series on one side of the multi-level DC-DC converter and in parallel on another side of the multi-level DC-DC converter and providing a controller that is in operable communication with each of the plurality of tranformer isolated DC-DC converters and the plurality of switching devices therein, with the controller being programmed to operate the plurality of switching devices in each respective tranformer isolated DC-DC converter in one of the On state and the Off state so as to selectively engage and disengage the respective tranformer isolated DC-DC converter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A multi-level DC-DC converter comprising:
   an input side to receive a DC power having an input voltage and current;
   an output side to provide power to a load at a desired output voltage and current; and
   a plurality of tranformer-isolated DC-DC converters connected between the input side and the output side, with the plurality of tranformer-isolated DC-DC converters being connected in series on one side and connected in parallel on another side;
   wherein each of the plurality of tranformer isolated DC-DC converters comprises:
      a power transformer comprising a primary winding arranged in an input side converter stage on the input side and a secondary winding arranged in an output side converter stage on the output side; and
      a plurality of switching devices each selectively operable in one of an On state and an Off state, wherein operating the plurality of switching devices in a complementary On state and Off state alternately at a controlled switching frequency provides for engaging the tranformer isolated DC-DC converter and operating the plurality of switching devices in a simultaneously On state bypasses the transformer isolated DC-DC converter.

2. The multi-level DC-DC converter of claim 1 further comprising a rectifier circuit configured to rectify AC power from an AC power source to a DC power, with the DC power being provided to the plurality of tranformer isolated DC-DC converters.

3. The multi-level DC-DC converter of claim 1 wherein the plurality of switching devices in each tranformer isolated DC-DC converter comprises a half-bridge circuit.

4. The multi-level DC-DC converter of claim 1 wherein the plurality of switching devices in each tranformer isolated DC-DC converter comprises a full-bridge circuit.

5. The multi-level DC-DC converter of claim 1 wherein each of the plurality of tranformer isolated DC-DC converters further comprises one or more capacitors configured to store and release DC power received on the input side.

6. The multi-level DC-DC converter of claim 5 further comprising a controller in operable communication with the arrangement of switching devices to selectively operate each of the plurality of switching devices in one of the On state and the Off state.

7. The multi-level DC-DC converter of claim 6 wherein, for each of the plurality of transformer isolated DC-DC converters, the controller is programmed to operate a plurality of switching devices in the On state so as to bypass the respective input capacitors, such that a respective transformer isolated DC-DC converter can be disengaged.

8. The multi-level DC-DC converter of claim 7 wherein the controller is programmed to selectively cause one or more of the transformer isolated DC-DC converters to be bypassed, so as to control a conversion ratio of the multi-level DC-DC converter.

9. The multi-level DC-DC converter of claim 1 wherein, for each of the plurality of transformer isolated DC-DC converters, the controller is programmed to selectively operate each of the plurality of switching devices in the On state and the Off state such that the respective transformer isolated DC-DC converter is engaged at a peak of an AC cycle.

10. The multi-level DC-DC converter of claim 1 wherein one or more of the plurality of tranformer isolated DC-DC converters comprises a chopper stage to feed the input side converter stage of the respective tranformer isolated DC-DC converter, the chopper stage performing modulation to provide for regulation of the voltage and/or current output from the respective tranformer isolated DC-DC converter.

11. The multi-level DC-DC converter of claim 1 wherein the output side converter stage of each of the plurality of tranformer isolated DC-DC converters comprises one of a diode rectifier or an arrangement of active switching devices.

12. The multi-level DC-DC converter of claim 1 wherein the plurality of switching devices are operated at a substantially fixed frequency and duty ratio.

13. A multi-level DC-DC converter comprising:
  an input side to receive a DC power having an input voltage and current;
  an output side to provide power to a load at a desired output voltage and current;
  a plurality of tranformer isolated DC-DC converters connected between the input side and the output side such that the plurality of tranformer isolated DC-DC converters are connected in series on one side and connected in parallel on the other side, each of the plurality of tranformer isolated DC-DC converters including a bridge circuit therein; and
  a controller in operable communication with each of the plurality of tranformer isolated DC-DC converters to selectively operate each respective bridge circuit, the controller being programmed to:
    determine a desired value of a voltage conversion ratio between the input voltage and the output voltage; and
    control operation of the bridge circuit in each respective tranformer isolated DC-DC converter based on the desired value of the voltage conversion ratio;
    wherein one or more of the tranformer isolated DC-DC converters may be shorted based on the controlled operation of the respective bridge circuits, so as to bypass one or more of the tranformer isolated DC-DC converters and set the voltage conversion ratio to the desired value.

14. The multi-level DC-DC converter of claim 13 wherein each of the plurality of tranformer isolated DC-DC converters further comprises:
  an input capacitor arranged in parallel with the bridge circuit; and
  a power transformer comprising a primary winding arranged on the input side and a secondary winding arranged on the output side.

15. The multi-level DC-DC converter of claim 14 wherein, for each of the plurality of transformer isolated DC-DC converters, the controller is programmed to operate the bridge circuit so as to bypass the input capacitor, such that a respective transformer isolated DC-DC converter is bypassed.

16. The multi-level DC-DC converter of claim 13 wherein one or more of the plurality of tranformer isolated DC-DC converters comprises a chopper stage to feed the input side converter stage of the respective tranformer isolated DC-DC converter, the chopper stage performing modulation to provide for regulation of the voltage and/or current output from the respective tranformer isolated DC-DC converter.

17. The multi-level DC-DC converter of claim 13 wherein the bridge circuit in each of the plurality of tranformer isolated DC-DC converters comprises one of a half-bridge circuit and a full bridge circuit.

18. A method of manufacturing a multi-level DC-DC converter, the method comprising:
  providing a plurality of tranformer isolated DC-DC converters, each of the plurality of tranformer isolated DC-DC converters comprising:
    a power transformer comprising a primary winding arranged in an input side converter stage and a secondary winding arranged in an output side converter stage; and
    a plurality of switching devices arranged in the input side converter stage, with each of the plurality of switching devices being selectively operable in one of an On state and an Off state to control voltage and current flow to the primary winding;
  connecting the plurality of tranformer isolated DC-DC converters in series on one side of the multi-level DC-DC converter and in parallel on another side of the multi-level DC-DC converter; and
  providing a controller that is in operable communication with each of the plurality of tranformer isolated DC-DC converters and the plurality of switching devices therein, with the controller being programmed to operate the plurality of switching devices in each respective tranformer isolated DC-DC converter in one of the On state and the Off state so as to selectively engage and disengage the respective tranformer isolated DC-DC converter.

19. The method of claim 18 wherein each of the plurality of tranformer isolated DC-DC converters further comprises one or more input capacitors that are selectively shorted based on the operation of the plurality of switching devices in one of the On state and the Off state, so as to so as to selectively engage and disengage the respective tranformer isolated DC-DC converter.

20. The method of claim 18 wherein one or more of the plurality of tranformer isolated DC-DC converters further comprises a chopper stage that performs a modulation to provide for regulation of an input voltage or current provided to a respective tranformer isolated DC-DC converter.

* * * * *